(12) United States Patent
Furukawa et al.

(10) Patent No.: US 11,626,741 B2
(45) Date of Patent: Apr. 11, 2023

(54) MANAGEMENT DEVICE AND POWER SUPPLY SYSTEM

(71) Applicant: SANYO Electric Co., Ltd., Osaka (JP)

(72) Inventors: Kimihiko Furukawa, Hyogo (JP); Tomonori Kunimitsu, Hyogo (JP)

(73) Assignee: SANYO Electric Co., Ltd., Daito (JP)

( * ) Notice: Subject to any disclaimer, the term of this patent is extended or adjusted under 35 U.S.C. 154(b) by 201 days.

(21) Appl. No.: 17/048,196

(22) PCT Filed: Apr. 5, 2019

(86) PCT No.: PCT/JP2019/015096
§ 371 (c)(1),
(2) Date: Oct. 16, 2020

(87) PCT Pub. No.: WO2019/208163
PCT Pub. Date: Oct. 31, 2019

(65) Prior Publication Data
US 2021/0159710 A1    May 27, 2021

(30) Foreign Application Priority Data

Apr. 25, 2018    (JP) .............................. JP2018-084433

(51) Int. Cl.
*H02J 7/00*    (2006.01)

(52) U.S. Cl.
CPC .......... *H02J 7/0014* (2013.01); *H02J 7/0048* (2020.01)

(58) Field of Classification Search
CPC .. H02J 7/0014; H02J 7/00; H02J 15/00; H02J 13/00007; H02J 13/00006; H01M 10/44
See application file for complete search history.

(56) References Cited

U.S. PATENT DOCUMENTS 8,878,492 B2 * 11/2014 Furukawa ........... H01M 10/425
                                                    320/137
9,728,821 B2 *  8/2017 Komatsu ................. B60L 50/64
(Continued)

FOREIGN PATENT DOCUMENTS

JP    2009-044802    2/2009
JP    2009-152998    7/2009
(Continued)

OTHER PUBLICATIONS

The Extended (Supplementary) European Search Report dated Feb. 26, 2021, issued in counterpart EP Application No. 19793279.1. (7 pages).

(Continued)

*Primary Examiner* — Richard Isla
*Assistant Examiner* — Sadia Kousar
(74) *Attorney, Agent, or Firm* — WHDA, LLP

(57) ABSTRACT

Main management unit manages the plurality of power storage modules via the plurality of sub-management units. Main management unit and the plurality of sub-management units are daisy-chain connected by power line. Main management unit can supply power from power storage unit other than the plurality of power storage modules to the plurality of sub-management units via power line. Main management unit and the plurality of sub-management units respectively include communication units. Each of communication units superimposes a communication signal on power line.

7 Claims, 5 Drawing Sheets

(56) References Cited

U.S. PATENT DOCUMENTS

| | | | |
|---|---|---|---|
| 9,851,412 B2* | 12/2017 | Haag | H01M 10/425 |
| 11,056,886 B2* | 7/2021 | Kato | H01M 10/425 |
| 2012/0116699 A1 | 5/2012 | Haag et al. | |
| 2013/0002203 A1 | 1/2013 | Kuraishi | |
| 2016/0269195 A1 | 9/2016 | Coenen et al. | |
| 2018/0048182 A1* | 2/2018 | Chan | G01R 31/396 |

FOREIGN PATENT DOCUMENTS

| | | | |
|---|---|---|---|
| JP | 2009152998 A | * | 7/2009 |
| JP | 2013-021851 | | 1/2013 |
| JP | 2014-175384 | | 9/2014 |
| JP | 2014175384 A | * | 9/2014 |
| JP | 2016-535489 | | 11/2016 |
| KR | 10-2016-0046221 A | | 4/2016 |
| WO | 2015/059314 | | 4/2015 |

OTHER PUBLICATIONS

International Search Report of PCT application No. PCT/JP2019/015096 dated Jun. 11, 2019.

\* cited by examiner ional Application No. PCT/JP2019/015096
MANAGEMENT DEVICE AND POWER SUPPLY SYSTEM

CROSS-REFERENCE TO RELATED APPLICATIONS

This application is a U.S. national stage application of the PCT International Application No. PCT/JP2019/015096 filed on Apr. 5, 2019, which claims the benefit of foreign priority of Japanese patent application No. 2018-084433 filed on Apr. 25, 2018, the contents all of which are incorporated herein by reference.

TECHNICAL FIELD

The present invention relates to a management device that manages a state of a power storage unit and a power supply system.

BACKGROUND ART

In recent years, hybrid vehicles (HV), plug-in hybrid vehicles (PHV), and electric vehicles (EV) have become popular. Secondary batteries are mounted as key devices in these vehicles. Nickel-hydrogen batteries and lithium-ion batteries are mainly used as in-vehicle secondary batteries. It is expected that the spread of lithium ion batteries with high energy density will accelerate in the future.

Lithium-ion batteries require stricter voltage control than other types of batteries because a normal area and a use prohibited area are close to each other. Generally, in a lithium-ion battery, from the viewpoint of maintaining power efficiency and ensuring safety, an equalization process is performed to equalize voltages between a plurality of cells connected in series (for example, see PTL 1).

Generally, a high-voltage power supply system is configured by serially connecting a plurality of power storage modules each including a plurality of cells connected in series. A power storage stack in which each power storage module is mounted includes a voltage detection circuit for detecting each voltage of a plurality of cells included in the power storage module and an equalization circuit for executing an equalization process between the plurality of cells. The voltage detection circuit transmits a detected voltage value to a management device that manages the whole of a plurality of power storage stacks via a communication line. The equalization circuit executes the equalization process based on a control signal received from the management device via the communication line.

A passive system is mainly used as a system of the equalization process. The passive system connects a discharge resistor to each of a plurality of cells connected in series, and discharges other cells such that voltages of the other cells are matched with a voltage of a cell having the lowest voltage.

There is an active system as another system of the equalization process. In the active system, a charging circuit is provided, and among a plurality of cells connected in series, other cells are charged such that the voltages of the other cells are matched with a voltage of a cell having the highest voltage. As a power source for charging, the power storage module itself including the cell to be charged may be used, or an external auxiliary battery (for example, a 12 V output lead battery) may be used.

CITATION LIST

Patent Literature

PTL 1: Unexamined Japanese Patent Publication No. 2013-21851

SUMMARY OF THE INVENTION

The power supply voltage of an integrated circuit (IC) or an active element in a power storage stack can be obtained from a power storage module in the power storage stack or can be obtained from an auxiliary battery. When the power is obtained from the auxiliary battery, a circuit board of the power storage stack and a circuit board of the management device are basically connected by two systems of wire harness of a communication line and a power line. Even when the power supply voltage of the IC or the active element in the power storage stack is obtained from the power storage module in the power storage stack, if an active cell balancing system that obtains the power source for charging from the outside is used, similarly both are connected with two systems of wire harness.

If both are connected by two systems of wire harness, the wiring inside the power supply system becomes complicated and the wiring cost rises.

The present invention has been made in view of such circumstances, and an object thereof is to provide a technique for simplifying wiring of a power supply system including a plurality of power storage modules and a management device.

Solution to Problem

In order to solve the above problems, a management device according to an aspect of the present invention includes a plurality of sub-management units that respectively manage a plurality of power storage modules each including a plurality of cells connected in series, and a main management unit that manages the plurality of power storage modules via the plurality of sub-management units. The main management unit and the plurality of sub-management units are daisy-chain connected by a power line, the main management unit is capable of supplying power from a power storage unit other than the plurality of power storage modules to the plurality of sub-management units via the power line, and each of the main management unit and the plurality of sub-management units includes a communication unit. Each communication unit superimposes a communication signal on the power line.

Advantageous Effect of Invention

According to the present invention, wiring of a power supply system including a plurality of power storage modules and a management device can be simplified.

DESCRIPTION OF EMBODIMENT

Figure 1:
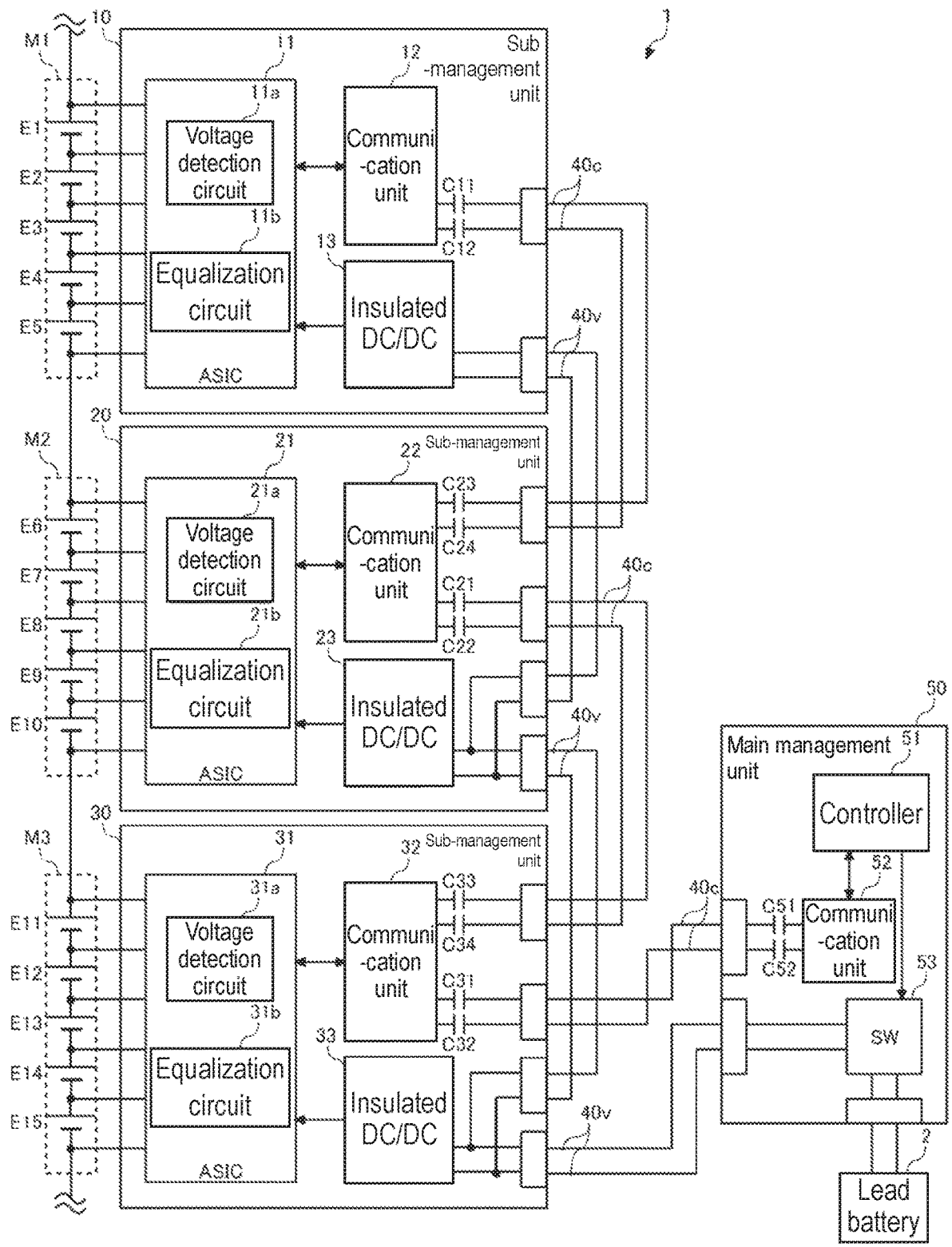
FIG. 1 is a diagram showing a configuration of a power supply system according to a comparative example.

FIG. 1 is a diagram showing a configuration of power supply system 1 according to a comparative example. Power supply system 1 includes a plurality of power storage modules (first power storage module M1 to third power storage module M3 in FIG. 1), a plurality of sub-management units (first sub-management unit 10 to third sub-management unit 30 in FIG. 1), and main management unit 50.

First power storage module M1 is formed by connecting a plurality of cells (first cell E1 to fifth cell E5 in FIG. 1) in series, and second power storage module M2 is formed by connecting a plurality of cells (sixth cell E6 to tenth cell E10 in FIG. 1) in series, and third power storage module M3 is formed by connecting a plurality of cells (eleventh cell E11 to fifteenth cell E15 in FIG. 1) in series. Note that the configuration of power storage modules M1 to M3 shown in FIG. 1 is simplified to simplify the description, and the actual configuration is, in many cases, a configuration in which more cells are connected in series depending on the voltage required for power supply system 1.

A lithium ion battery cell, a nickel hydrogen battery cell, a lead battery cell, an electric double layer capacitor cell, a lithium ion capacitor cell, or the like can be used for each cell. Hereinafter, in the present specification, an example using a lithium ion battery cell (nominal voltage: 3.6 to 3.7 V) is assumed.

First power storage module M1 and first sub-management unit 10 constitute one power storage stack. First sub-management unit 10 includes application specific integrated circuit (ASIC) 11, communication unit 12, and insulated DC/DC converter (direct current-direct current) 13, which are mounted on one circuit board. Communication unit 12 may be incorporated in ASIC 11.

Similarly, second power storage module M2 and second sub-management unit 20 also constitute one power storage stack, and second sub-management unit 20 includes ASIC 21, communication unit 22, and insulated DC/DC converter 23. Similarly, third power storage module M3 and third sub-management unit 30 also constitute one power storage stack, and third sub-management unit 30 includes ASIC 31, communication unit 32, and insulated DC/DC converter 33.

Main management unit 50 includes controller 51, communication unit 52, and power switch 53, which are mounted on one circuit board. Controller 51 is composed of, for example, a microcomputer. Communication unit 52 may be incorporated in the microcomputer.

ASIC 11 of first sub-management unit 10 includes voltage detection circuit 11a and equalization circuit 11b. Voltage detection circuit 11a is connected to each node of a plurality of cells E1 to E5 connected in series by a plurality of voltage lines, and detects a voltage between two adjacent voltage lines, thereby detecting a voltage of each cell E1 to E5. Voltage detection circuit 11a includes a multiplexer and an A/D converter (analog to digital converter: not shown). The multiplexer outputs the voltage values of the plurality of cells E1 to E5 to the AD converter in a predetermined order, and the AD converter converts an analog signal input from the multiplexer into a digital value. The voltage values of the plurality of cells E1 to E5 converted into digital values by the AD converter are output to communication unit 12.

Equalization circuit 11b equalizes the plurality of cells E1 to E5 included in first power storage module M1. In this comparative example, equalization circuit 11b equalizes the voltages/capacities between the plurality of cells E1 to E5 by using the active cell balancing system. A configuration example of equalization circuit 11b will be described later.

Communication unit 12 transmits the voltage values of the plurality of cells E1 to E5 included in first power storage module M1 input from voltage detection circuit 11a to main management unit 50 via communication line 40c. First sub-management unit 10 to third sub-management unit 30 and main management unit 50 are daisy-chain connected by communication line 40c. The daisy-chain connection means a connection method in which a plurality of devices are connected in a line, and is a connection method in which a signal is propagated between adjacent devices. In the example shown in FIG. 1, main management unit 50 and first sub-management unit 10 are respectively terminated, and main management unit 50 and third sub-management unit 30 adjacent to each other, third sub-management unit 30 and second sub-management unit 20 adjacent to each other, and second sub-management unit 20 and first sub-management unit 10 adjacent to each other are respectively connected by communication lines 40c. In the example shown in FIG. 1, communication line 40c is configured by a differential wiring (two lines) having high noise resistance, but it may be configured by a single line or four lines.

Communication unit 12 of first sub-management unit 10 transmits the voltage values of the plurality of cells E1 to E5 included in first power storage module M1 to controller 51 of main management unit 50 via communication unit 22 of second sub-management unit 20, communication unit 32 of third sub-management unit 30, and communication unit 52 of main management unit 50. Communication unit 22 of second sub-management unit 20 transmits the voltage values of the plurality of cells E6 to E10 included in second power storage module M2 to controller 51 of main management unit 50 via communication unit 32 of third sub-management unit 30 and communication unit 52 of main management unit 50. Communication unit 32 of third sub-management unit 30 transmits the voltage values of the plurality of cells E11 to E15 included in third power storage module M3 to controller 51 of main management unit 50 via communication unit 52 of main management unit 50.

If at least one temperature sensor (for example, a thermistor) for detecting the temperatures of the plurality of cells included in each power storage module is mounted in each power storage stack, each of communication units 12 to 32 of first sub-management unit 10 to third sub-management unit 30 also transmits temperature values of the plurality of cells detected by at least one temperature sensor to controller 51, in addition to the voltage values of the plurality of cells.

For communication between communication unit 12 of first sub-management unit 10, communication unit 22 of second sub-management unit 20, communication unit 32 of third sub-management unit 30, and communication unit 52 of main management unit 50, a predetermined serial communication system can be used. For example, SPI (Serial Peripheral Interface), I2C (Inter-Integrated Circuit), or UART (Universal Asynchronous Receiver/Transmitter) can be used. Further, a manufacturer's own communication system based on these communication systems may be used.

Communication unit 12 of first sub-management unit 10 includes one system of communication terminal. The single-port communication terminal of communication unit 12 is connected to a connector for communication via differential wiring. Capacitor C11 and capacitor C12 are respectively inserted in the differential wiring.

Communication unit 22 of second sub-management unit 20 includes two systems of communication terminals, an uplink port and a downlink port. The communication terminal of the uplink port of communication unit 22 is connected to the uplink connector via differential wiring. Capacitor C21 and capacitor C22 are respectively inserted in the differential wiring. The communication terminal of the downlink port of communication unit 22 is connected to the downlink connector via differential wiring. Capacitor C23 and capacitor C24 are respectively inserted in the differential wiring.

Communication unit 32 of third sub-management unit 30 also includes two systems of communication terminals, an uplink port and a downlink port. The communication terminal of the uplink port of communication unit 32 is connected to the uplink connector via differential wiring. Capacitor C31 and capacitor C32 are respectively inserted in the differential wiring. The communication terminal of the downlink port of communication unit 32 is connected to the downlink connector via differential wiring. Capacitor C33 and capacitor C34 are respectively inserted in the differential wiring.

Communication unit 52 of main management unit 50 includes one system of communication terminal. The single-port communication terminal of communication unit 52 is connected to the connector for communication via differential wiring. Capacitor C51 and capacitor C52 are respectively inserted in the differential wiring.

Between the connector for communication of first sub-management unit 10 and the connector for downlink of second sub-management unit 20, between the connector for uplink of second sub-management unit 20 and the connector for downlink of third sub-management unit 30, between the connector for uplink of third sub-management unit 30 and the connector for communication of main management unit 50 are respectively connected by communication lines 40c (differential wiring).

Capacitors C11 to C12, C21 to C24, C31 to C34, and C51 to C52 are capacitors for DC cut that insulate in terms of DC between two adjacent communication units connected by communication lines 40c. In the above embodiment, as an insulating circuit for enabling communication between circuits having different ground potentials, the configuration including capacitors C11 to C12, C21 to C24, C31 to C34, and C51 to C52 are used, but these insulating circuits may be configured by using other elements such as transformers.

Controller 51 of main management unit 50 acquires the voltage values and temperature values of the plurality of cells E1 to E15 from first sub-management unit 10 to third sub-management unit 30 via communication lines 40c. Controller 51 also acquires the values of currents flowing through the plurality of power storage modules M1 to M3 detected by the current detection units (not shown).

Controller 51 estimates the SOC (State Of Charge) and SOH (State Of Health) of the plurality of cells E1 to E15 based on the voltage values, temperature values, and current values of the plurality of cells E1 to E15. The SOC can be estimated by, for example, an OCV (Open Circuit Voltage) method or a current integration method. The OCV method is a method for estimating the SOC based on the detected cell OCV and the characteristic data of the SOC-OCV curve held in advance. The current integration method is a method for estimating the SOC based on the OCV at the start of charging/discharging of the detected cell and the integrated value of the detected current.

The SOH is defined as the ratio of the current full charge capacity to the initial full charge capacity, and the lower the value (the closer to 0%), the more the deterioration progresses. The deterioration of the secondary battery can be approximated by the sum of storage deterioration and cycle deterioration.

The storage deterioration is deterioration that progresses over time depending on the temperature of the secondary battery at each time point and the SOC at each time point, regardless of whether the secondary battery is being charged or discharged. The higher the SOC at each time point (the closer to 100%) or the higher the temperature at each time point, the higher the storage deterioration rate.

The cycle deterioration is deterioration that progresses as a number of charge and discharge increases. The cycle degradation depends on the SOC range used, temperature, and current rate. The wider the SOC range used, the higher the temperature, or the higher the current rate, the higher the cycle deterioration rate. As described above, the deterioration of the secondary battery largely depends on the usage environment, and the dispersion of the capacities of the plurality of cells E1 to E15 becomes larger as the usage period becomes longer.

Controller 51 of main management unit 50 executes the equalization process between the plurality of cells E1 to E15 based on the voltage values of the plurality of cells E1 to E15 received from the plurality of sub-management units 10 to 30. In the active cell balancing system, other cells are charged up to the capacity of the cell having the largest capacity (hereinafter, referred to as a target value) among the plurality of cells E1 to E15. The target value may be defined by any of the actual capacity, SOC, and OCV. When defined by OCV, the OCV of the cell having the highest OCV becomes the target value. The target value may be defined by the dischargeable amount or the chargeable amount.

Controller 51 calculates the difference between the target value of the cell having the largest capacity among the plurality of cells E1 to E15 and the detected values of the other plurality of cells, respectively. Controller 51 calculates the charge amounts of the other plurality of cells based on the calculated respective differences, and calculates the charge times of the other plurality of cells based on the calculated respective charge amounts. Controller 51 generates a control signal for the equalization process including charging times of a plurality of cells managed by the sub-management unit, for each sub-management unit of the transmission destination, and outputs the control signal to communication unit 52.

It should be noted that each of the plurality of sub-management units 10 to 30 is assigned a unique ID in advance, and controller 51 sets a sub-management unit ID to the header area of the packet including the control signal to be transmitted to the specific sub-management unit. Communication unit 52 transmits the control signal input from controller 51 to the plurality of sub-management units 10 to 30 via communication line 40c.

Each of communication units 12 to 32 of the plurality of sub-management units 10 to 30, when having received the packet including the control signal via communication line 40c, determines whether or not the ID in the packet is the ID of its own sub-management unit. When the ID in the packet is the ID of its own sub-management unit, the control signal included in the received packet is output to the ASIC in the sub-management unit. If the ID in the packet is not the ID of its own sub-management unit, the packet is transferred to the next sub-management unit.

As described above, the power storage module itself including the cells to be equalized may be used as a power source for charging in the active cell balancing system, or a power source provided outside power supply system 1 may be used. In this comparative example, the latter that can complete the equalization in a shorter time than the former is adopted. Specifically, lead battery 2 used as an auxiliary battery in the vehicle is used as a power source for equalizing charging. Lead battery 2 may have a capacity increased by connecting a nickel-hydrogen battery, a lithium-ion battery, an electric double layer capacitor, or the like in parallel.

Main management unit 50 can supply the power supply voltage (for example, a 12V DC voltage) supplied from lead battery 2 to first sub-management unit 10 to third sub-management unit 30 via power lines 40v. Power switch 53 of main management unit 50 is a switch for switching between supplying or shutting off the power supplied from lead battery 2 to first sub-management unit 10 to third sub-management unit 30. First sub-management unit 10 to third sub-management unit 30 and main management unit 50 are connected by power lines 40v. In the example shown in FIG. 1, between main management unit 50 and third sub-management unit 30, between third sub-management unit 30 and second sub-management unit 20, and between second sub-management unit 20 and first sub-management unit 10 are respectively connected by power lines 40v. Power line 40v is composed of two lines, a plus line and a minus line.

The electric potentials of power lines 40v connecting between first sub-management unit 10, second sub-management unit 20, third sub-management unit 30, and main management unit 50 are basically the same potential. In the example shown in FIG. 1, power line 40v is branched in each of sub-management units 10 to 30, but power line 40v may be branched outside each of sub-management units 10 to 30.

Insulated DC/DC converter 13 of first sub-management unit 10 converts a DC voltage input via power line 40v into a DC voltage for charging and outputs it to equalization circuit 31b. When the power source for ASIC 11 is covered by the power source of lead battery 2, insulated DC/DC converter 13 generates a DC voltage for charging and a power supply voltage for ASIC 11 from the DC voltage input via power line 40v. The same applies to insulated DC/DC converter 23 of second sub-management unit 20 and insulated DC/DC converter 33 of third sub-management unit 30.

In the comparative example shown above, between first sub-management unit 10, second sub-management unit 20, third sub-management unit 30, and main management unit 50 are connected by two systems of wire harness of communication lines 40c and power lines 40v, and the wiring becomes complicated and the wiring cost increases.

Figure 2:
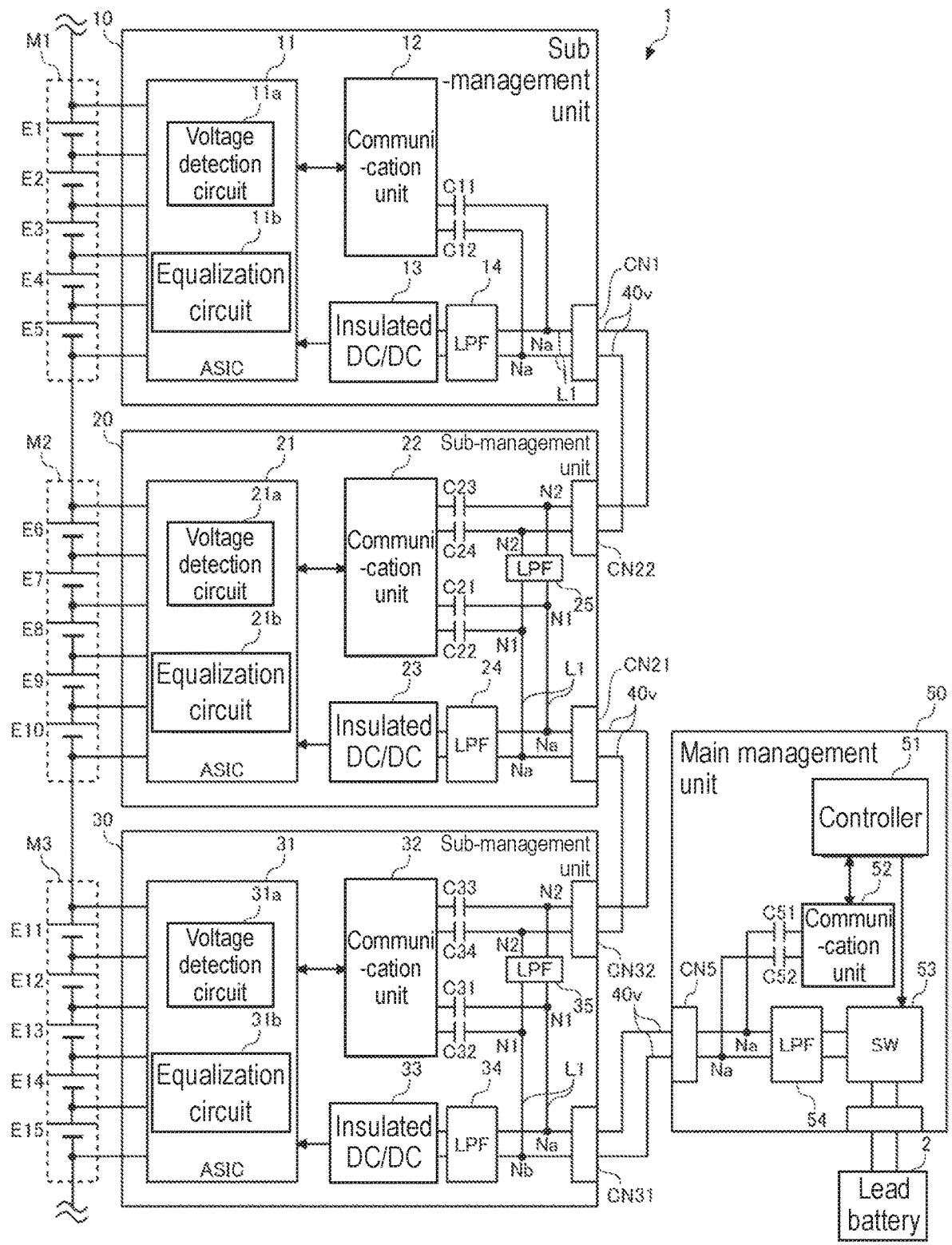
FIG. 2 is a diagram showing a configuration of a power supply system according to an exemplary embodiment of the present invention.

FIG. 2 is a diagram showing the configuration of power supply system 1 according to the exemplary embodiment of the present invention. Hereinafter, differences from the configuration according to the comparative example shown in FIG. 1 will be described. In the exemplary embodiment, communication line 40c is omitted, and the communication signals between the plurality of sub-management units 10 to 30 and main management unit 50 are superimposed on power line 40v and transmitted. Each of communication units 12 to 32 of the plurality of sub-management units 10 to 30 and communication unit 52 of main management unit 50 includes a power line communication (PLC) modem. The PLC modem executes, for example, low-speed PLC communication using the 10 kHz to 450 kHz band or high-speed PLC communication using the 2 MHz to 30 MHz band.

Connector CN5 of main management unit 50 to which power line 40v is connected and power switch 53 in main management unit 50 are connected by an internal power line. The differential signal line is branched from connection point Na on the internal power line, and the differential signal line is connected to the communication terminal of communication unit 52. Low-pass filter 54 is inserted in the internal power line. Low-pass filter 54 is inserted between connection point Na and power switch 53 on the internal power line. Low-pass filter 54 removes the high frequency components of the power input from power switch 53. As low-pass filter 54, for example, an LC filter or an RC filter can be used. Capacitor C51 and capacitor C52 are inserted in the differential signal line. Capacitor C51 and capacitor C52 are capacitors for DC cut that insulate in terms of DC between communication unit 52 and the internal power line.

Power line 40v connects between connector CN5 of main management unit 50 and first connector CN31 of third sub-management unit 30. In third sub-management unit 30, first connector CN31 and second connector CN32 are connected by internal power line L1. A power branch line is branched from connection point Na of internal power line L1, and the power branch line is connected to insulated DC/DC converter 33. Low-pass filter 34 is inserted in the power branch line. Low-pass filter 34 removes the high frequency components of the electric power input from connection point a of internal power line L1 and outputs it to insulated DC/DC converter 33. Also for low-pass filter 34, for example, an LC filter or an RC filter can be used.

A first differential signal wiring is branched from first connection point N1 of internal power line L1 of third sub-management unit 30, and the first differential signal wiring is connected to the communication terminal of the uplink port of communication unit 32. Capacitor C31 and capacitor C32 are inserted in the first differential signal wiring, respectively. A second differential signal wiring is branched from second connection point N2 of internal power line L1 of third sub-management unit 30, and the second differential signal wiring is connected to the communication terminal of the downlink port of communication unit 32. Capacitor C33 and capacitor C34 are inserted in the second differential signal wiring, respectively.

Capacitors C31 to C34 are capacitors for DC cut that insulate in terms of DC between communication unit 32 and internal power line L1. On internal power line L1 of third sub-management unit 30, low-pass filter 35 is inserted between first connection point N1 and second connection point N2. Low-pass filter 35 is a filter that allows DC power to pass between first connection point N1 and second connection point N2 and blocks high-frequency components.

Power line 40v connects between second connector CN32 of third sub-management unit 30 and first connector CN21 of second sub-management unit 20. In second sub-management unit 20, first connector CN21 and second connector CN22 are connected by internal power line L1. A power branch line branches from connection point Na of internal power line L1, and the power branch line is connected to insulated DC/DC converter 23. Low-pass filter 24 is inserted in the power branch line. Low-pass filter 24 removes the high frequency components of the power input from connection point a of internal power line L1 and outputs it to insulated DC/DC converter 23.

A first differential signal wiring is branched from first connection point N1 of internal power line L1 of second sub-management unit 20, and the first differential signal wiring is connected to the communication terminal of the uplink port of communication unit 22. Capacitor C21 and capacitor C22 are inserted in the first differential signal wiring, respectively. A second differential signal wiring is branched from second connection point N2 of internal power line L1 of second sub-management unit 20, and the second differential signal wiring is connected to the communication terminal of the downlink port of communication unit 22. Capacitor C23 and capacitor C24 are inserted in the second differential signal wiring, respectively.

Capacitors C21 to C24 are capacitors for DC cut that insulate in terms of DC between communication unit 22 and internal power line L1. On internal power line L1 of second sub-management unit 20, low-pass filter 25 is inserted between first connection point N1 and second connection point N2. Low-pass filter 25 is a filter that allows DC power to pass between first connection point N1 and second connection point N2 and blocks high-frequency components.

Power line 40v connects between second connector CN22 of second sub-management unit 20 and connector CN1 of first sub-management unit 10. In first sub-management unit 10, connector CN1 and insulated DC/DC converter 13 are connected by internal power line L1. Low-pass filter 14 is inserted in internal power line L1. Low-pass filter 14 removes the high frequency components of the input power and outputs it to insulated DC/DC converter 13.

A differential signal wiring is branched from connection point Na of internal power line L1 of first sub-management unit 10, and the differential signal wiring is connected to the communication terminal of communication unit 12. Capacitor C11 and capacitor C12 are inserted in the differential signal wiring, respectively. Capacitor C11 and capacitor C12 are capacitors for DC cut that insulate in terms of DC between communication unit 12 and connection point Na.

Figure 3:
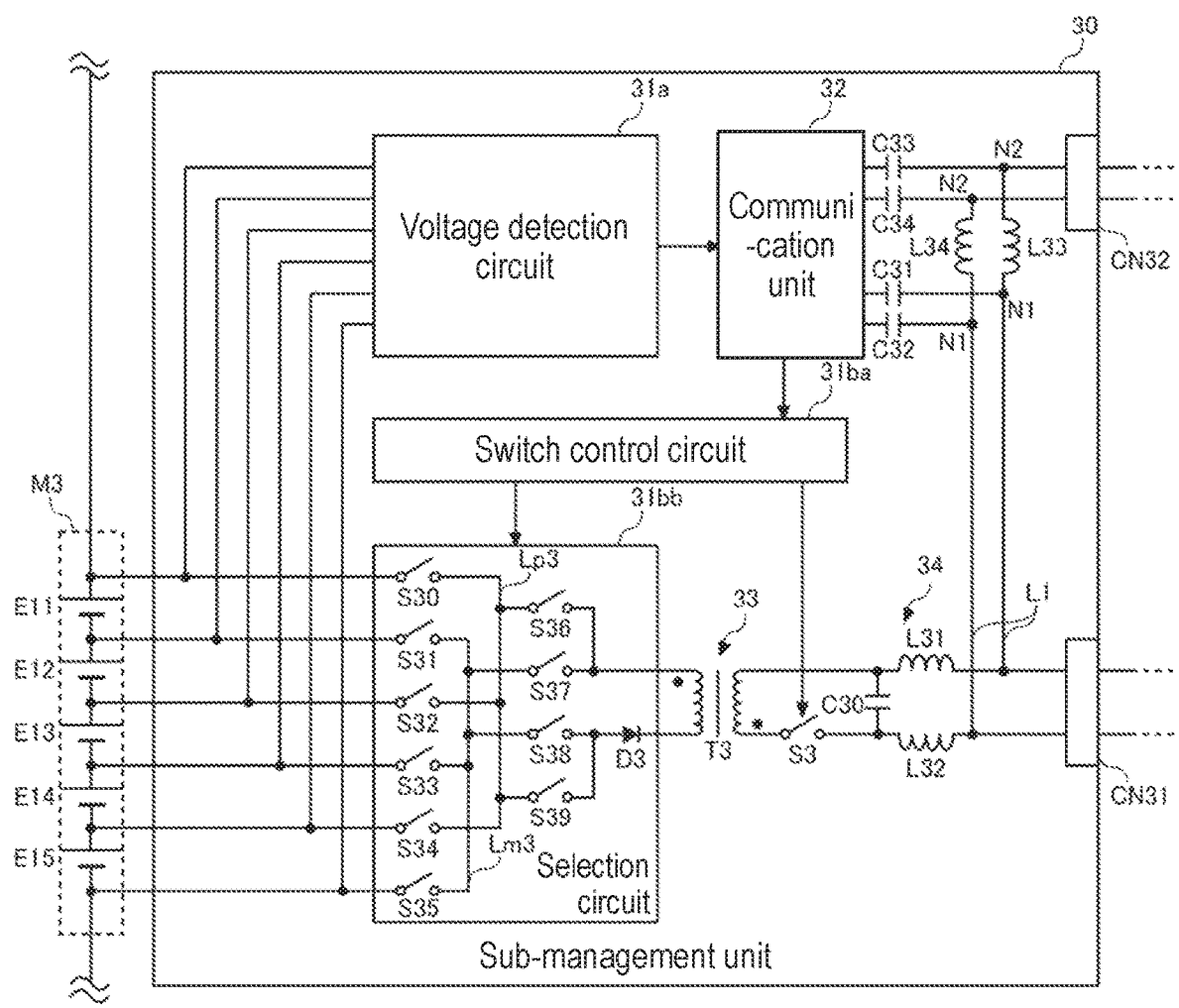
FIG. 3 is a diagram showing a configuration example of a third sub-management unit in FIG. 2.

FIG. 3 is a diagram showing a configuration example of third sub-management unit 30 in FIG. 2. In the configuration example shown in FIG. 3, equalization circuit 31b is composed of switch control circuit 31ba and cell selection circuit 31bb. Cell selection circuit 31bb includes a plurality of switches S30 to S39.

In FIG. 3, insulated DC/DC converter 33 is composed of an isolated flyback DC/DC converter. The isolated flyback DC/DC converter includes transformer T3, switch S3, and diode D3. In the isolated flyback DC/DC converter shown in FIG. 3, the primary winding and the secondary winding of transformer T3 are connected in opposite polarities. Insulated DC/DC converter 33 is not limited to the isolated flyback DC/DC converter, and may have any configuration as long as it is an insulation type power supply circuit. As this type of power supply circuit, an isolated forward DC/DC converter and the like are known in addition to the isolated flyback DC/DC converter described above.

Both ends of the primary winding of transformer T3 are connected to power line 40v via low-pass filter 34. Switch S3 is inserted between one end of the primary winding and the minus line of power line 40v. Rectifying diode D3 is connected to one end of the secondary winding of transformer T3.

The secondary winding of transformer T3 and both ends of any one of the plurality of cells E11 to E15 are connected via the plurality of switches S30 to S39. A voltage line is connected to each node of the plurality of cells E11 to E15. The first voltage line, the third voltage line, and the fifth voltage line are connected by positive electrode wiring Lp3, and the second voltage line, the fourth voltage line, and the sixth voltage line are connected by negative electrode wiring Lm3. Switches S30 to S35 are inserted in the first voltage line to the sixth voltage line, respectively.

The current output side terminal of the secondary winding of transformer T3 and positive electrode wiring Lp3 are connected via switch S36, and the current output side terminal of the secondary winding and negative electrode wiring Lm3 are connected via switch S37. The current input side terminal of the secondary winding of transformer T3 and positive electrode wiring Lp3 are connected via switch S39, and the current input side terminal of the secondary winding and negative electrode wiring Lm3 are connected via switch S38.

Switch control circuit 31ba turns on and off switch S3 of the isolated flyback DC/DC converter and the plurality of switches S30 to S39 of cell selection circuit 31bb based on the control signal of the equalization process input from communication unit 32.

Switch control circuit 31ba controls the two switches, switch S36 or S37 and switch S38 or S39, which are inserted in the two voltage lines connected to the nodes at both ends of the cell to be charged, to be in the ON state. For example, when cell E11 is charged, switch S30, switch S31, switch S36, and switch S38 are controlled to be in the ON state. When cell E12 is charged, switch S31, switch S32, switch S37, and switch S39 are controlled to be in the ON state. The on-time of each cell follows the charging time of each cell included in the control signal received from controller 51 of main management unit 50. The order of charging the plurality of cells E11 to E15 may be the order of long charging time or the order from the top.

Switch control circuit 31ba may be configured to perform pulse width modulation (PWM) control of switch S3. Depending on the circuit configuration, the ground of switch control circuit 31ba may have a different potential from the ground of the circuit including switch S3. In the case of such a configuration, the control signal from switch control circuit 31ba is insulated via the insulating circuit. The isolated flyback DC/DC converter steps down the voltage of lead battery 2 and outputs the charging voltage. When a cell is connected to the output side of the isolated flyback DC/DC converter, the charging current flows according to the cell voltage, but the current amount of this charging current can be adjusted by PWM control of switch S3. In this way, the output of the isolated flyback DC/DC converter can be adjusted by the turn ratio of the primary winding and the secondary winding of transformer T3 and the duty ratio of switch S3. Note that various systems can be used for charge control. As the charge control, typically, a constant current constant voltage system (CC-CV) is known, but any configuration may be used, as long as it is a system capable of charging a target cell by using a DC voltage supplied from lead battery 2.

In the configuration example shown in FIG. 3, an LC filter including inductor L31, inductor L32, and capacitor C30 is used as low-pass filter 34 inserted before insulated DC/DC converter 33. The LC filter removes the communication signal (high frequency pulse signal) and common mode noise superimposed on power line 40v.

In the configuration example shown in FIG. 3, inductor L33 and inductor L34 are used as low-pass filter 35 inserted between first connection point N1 and the second connection point of internal power line L1 of third sub-management unit 30. Inductor L33 and inductor L34 remove the communication signal (high frequency pulse signal) and the common mode noise superimposed on power line 40v. Therefore, the DC voltage supplied from lead battery 2 is transmitted from first connector CN31 to second connector CN32 via low-pass filter 35, and the communication signal is transmitted from first connector CN31 to second connector CN32 via communication unit 32.

Figure 4:
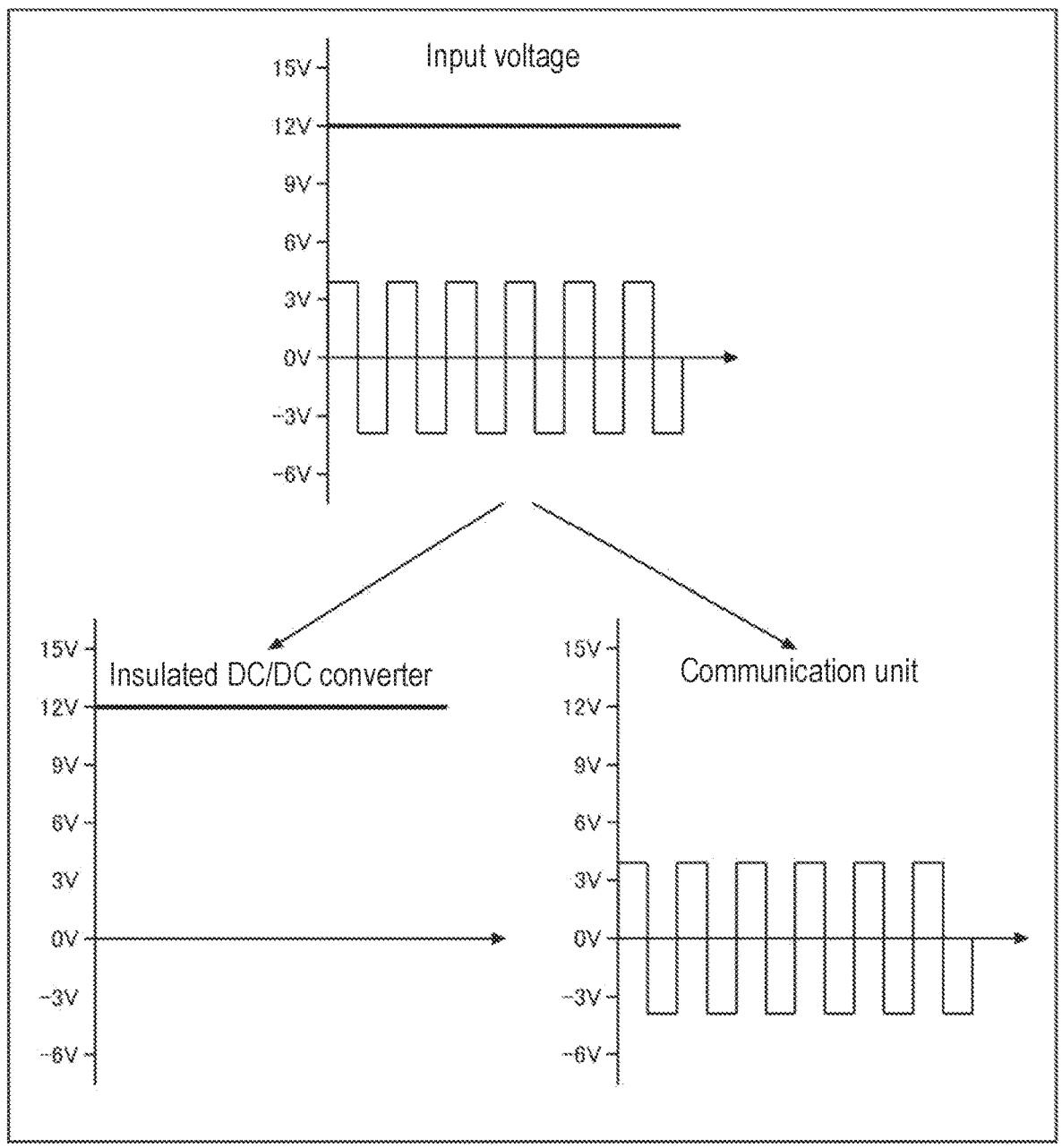
FIG. 4 is a diagram schematically showing an input voltage input to the third sub-management unit via a power line.

FIG. 4 is a diagram schematically showing an input voltage input to third sub-management unit 30 via power line 40v. The 12V DC voltage generated by lead battery 2 and the high-frequency pulse signal generated by communication unit 52 of main management unit 50 are superimposed on the input voltage input to third sub-management unit 30 via power line 40v. The 12V DC voltage from which the high-frequency pulse signal has been removed by low-pass filter 34 is input to insulated DC/DC converter 33. Communication unit 32 of third sub-management unit 30 receives the high frequency pulse signal in which the 12V DC voltage is cut by capacitors C31 and C32.

At second connection point N2, the high frequency pulse signal transmitted from communication unit 32 and the 12V DC voltage input via low-pass filter 35 are superimposed, and the voltage on which both are superimposed is output from second connector CN32 to second sub-management unit 20 via power line 40v.

The configuration of third sub-management unit 30 described above is similarly applied also to second sub-management unit 20 and first sub-management unit 10. When applied to first sub-management unit 10, inductor L33, inductor L34, capacitor C33, capacitor C34, and second connector CN32 are unnecessary.

As described above, according to the present exemplary embodiment, the plurality of sub-management units 10 to 30 and main management unit 50 are connected not by two systems of power line 40v and communication line 40c but by one system of power line 40v, and the communication signal is superimposed on power line 40v. As a result, one system of the wiring harness can be used between the plurality of sub-management units 10 to 30 and main management unit 50, and the wiring can be simplified. Further, it is possible to suppress an increase in wiring cost.

Further, by equalizing the plurality of cells E1 to E15 by using the active cell balancing system using the external power source (lead battery 2), it is possible to complete the equalization without wasting the energy of the plurality of cells E1 to E15 and quickly.

The present invention has been described above based on the exemplary embodiment. It will be understood by those skilled in the art that the exemplary embodiment is merely an example, various modifications are available in each constituent element thereof or in a combination of each processing process, and such modifications still fall within the scope of the present invention.

Figure 5:
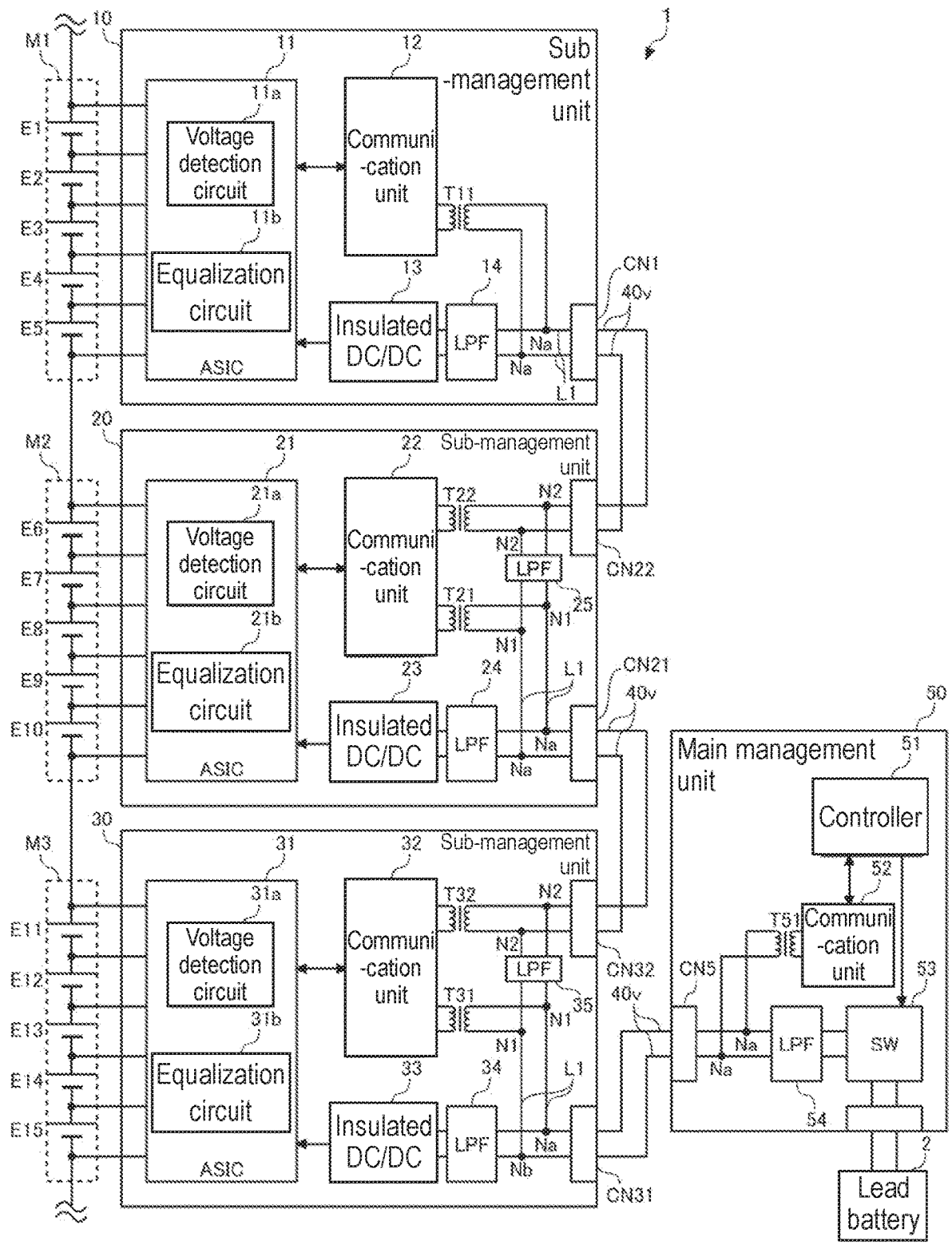
FIG. 5 is a diagram showing a configuration of a power supply system according to a modification.

FIG. 5 is a diagram showing a configuration of power supply system 1 according to a modification. The circuit configuration shown in FIG. 5 is a configuration in which capacitors C11 to C12, C21 to C22, C23 to C24, C31 to C32, C33 to C34, and C51 to C52 of the circuit configuration shown in FIG. 2 are replaced with transformer T11, transformer T21, transformer T22, transformer T31, transformer T32, and transformer T51, respectively. By using the transformer, it is possible to reliably insulate between the communication unit and the power line.

Further, in the above-described exemplary embodiment, the example in which the equalization circuit of the active cell balancing system is used has been described. In this respect, a passive cell balancing system equalization circuit may be used. In that case, the DC voltage supplied from lead battery 2 and stepped down by insulated DC/DC converters 13 to 33 is used as the power supply voltage of ASICs 11 to 31 or the power supply voltage of the active element. In the above-described exemplary embodiment, an example in which the low-pass filter or DC cut filter is configured by passive elements such as inductors and capacitors has been described, but when active elements such as operational amplifiers and photocouplers are used for the low-pass filter and DC cut filter, the power supply voltage is required.

Further, in the above-described exemplary embodiment, similarly to communication unit 22 of second sub-management unit 20 and communication unit 32 of third sub-management unit 30, a two-port configuration may be used for communication unit 12 of first sub-management unit 10 and communication unit 52 of main management unit 50, and first sub-management unit 10 and main management unit 50 may be connected by another power line 40v to form a ring-type daisy chain connection. In this case, the degree of superimposition and robustness of communication and power supply are improved. Further, the power consumption among communication unit 12 of first sub-management unit 10, communication unit 22 of second sub-management unit 20, and communication unit 32 of third sub-management unit 30 is further leveled.

The exemplary embodiment may be specified by the following items.

[Item 1]

Management device (10 to 50) comprising:

a plurality of sub-management units (10 to 30) that respectively manage a plurality of power storage modules (M1 to M3) each including a plurality of cells (E1 to E5, E6 to E10, E1 to E15) connected in series; and main management unit (50) that manages the plurality of power storage modules (M1 to M3) via the plurality of sub-management units (10 to 30), wherein main management unit (50) and the plurality of sub-management units (10 to 30) are daisy-chain connected by power line (40v), main management unit (50) is capable of supplying power from power storage unit (2) other than the plurality of power storage modules (M1 to M3) to the plurality of sub-management units (10 to 30) via power line (40v), each of main management unit (50) and the plurality of sub-management units (10 to 30) includes communication unit (12 to 32), and each communication unit (12 to 32) superimposes a communication signal on power line (40v).

According to this, wiring between the plurality of sub-management units (10 to 30) and main management unit (50) can be simplified.

[Item 2]

Management device (10 to 50) according to item 1, wherein sub-management unit (30) further includes voltage detection circuit (31a) that detects each voltage of a plurality of cells (E11 to E15) included in power storage module (M3), and equalization circuit (31b) that equalizes capacities and voltages of a plurality of cells (E11 to E15) included in power storage module (M3), and communication unit (32) transmits voltages of a plurality of cells (E11 to E15) detected by voltage detection circuit (31a) to main management unit (50) via power line (40v), and receives a control signal for controlling equalization circuit (31b) from main management unit (50) via power line (40v).

According to this, using the communication between the plurality of sub-management unit (10 to 30) and main management unit (50), the plurality of cells (E1 to E5, E6 to E10, E1 to E15) included in the plurality of power storage modules (M1 to M3) can be equalized.

[Item 3]

Management device (10 to 50) according to item 2, wherein sub-management unit (30) further includes DC/DC converter (33) that converts a DC voltage supplied from power storage unit (2) other than the plurality of power storage modules (M1 to M3) via power line (40v), into a predetermined DC voltage, and equalization circuit (31b) charges, among a plurality of cells (E11 to E15) included in the power storage module (M3), a cell designated by the control signal with a DC voltage converted by DC/DC converter (33).

According to this, active cell balancing using an external power source can be put to practical use with simple wiring.

[Item 4]

Management device (10 to 50) according to any one of items 1 to 3, wherein sub-management unit (30) further includes a first signal wiring that connects first connection point (N1) of power line (L1) and a first communication terminal of communication unit (32), a second signal wiring that connects second connection point (N2) of power line (L1) and a second communication terminal of communication unit (32), first insulating circuit (C31, C32) that is inserted in the first signal wiring for insulating between first connection point (N1) and the first communication terminal in terms of DC, second insulating circuit (C33, C34) that is inserted in the second signal wiring for insulating between second connection point (N2) and the second communication terminal in terms of DC, and low-pass filter (25) inserted between first connection point (N1) and second connection point (N2) of power line (L1).

According to this, the communication signal and the DC voltage can be separated or superimposed.

[Item 5]

Management device (10 to 50) according to item 4, wherein first insulating circuit (C31, C32) is capacitor (C31, C32), second insulating circuit (C33, C34) is capacitor (C33, C34), and low-pass filter (35) is inductor (L33, L34).

According to this, a circuit can be generated at low cost.

[Item 6]

Management device (10 to 50) according to item 4, wherein first insulating circuit (T31) is transformer (T31), second insulating circuit (T32) is transformer (T32), and low-pass filter (35) is inductor (L33, L34).

According to this, insulation can be performed more reliably at low cost.

[Item 7]

Power supply system (1) comprising:

a plurality of power storage modules (M1 to M3) each including a plurality of cells (E1 to E5, E6 to E10, E1 to E15) connected in series, and management device (10 to 50) according to any one of items 1 to 6.

According to this, wiring between the plurality of sub-management units (10 to 30) and main management unit (50) can be simplified.

REFERENCE MARKS IN THE DRAWINGS

1: power supply system
2: lead battery
M1-M3: power storage module
E1-E15: five cells
10: first sub-management unit
20: second sub-management unit
30: third sub-management unit
50: main management unit
11: ASIC
11a: voltage detection circuit
11b: equalization circuit
12: communication unit
13: insulated DC/DC converter
21a: voltage detection circuit
21b: equalization circuit
22: communication unit
23: insulated DC/DC converter
31a: voltage detection circuit
31b: equalization circuit
31ba: switch control circuit
31bb: cell selection circuit
32: communication unit
33: insulated DC/DC converter
40c: communication line
40v: power line
51: controller
52: communication unit
53: power switch
CN1, CN21, CN22, CN31, CN32, CN5: connector
C13, C14, C21, C22, C23, C24, C21, C22, C23, C24, C31, C32, C33, C34, C51, C52, C30: capacitor
14, 24, 25, 34, 35, 54: low-pass filter
L1: internal power line
L31, L32, L33, L34: inductor
T3: transformer
S3, S30, S31, S32, S33, S34, S35, S36, S37, S38, S39: switch

The invention claimed is:

1. A management device comprising:

a plurality of sub-management units that respectively manage a plurality of power storage modules each including a plurality of cells connected in series; and a main management unit that manages the plurality of power storage modules via the plurality of sub-management units, wherein the main management unit and the plurality of sub-management units are daisy-chain connected by a power line, the main management unit is configured to supply DC power from a power storage unit other than the plurality of power storage modules to the plurality of sub-management units via the power line, wherein the power line is configured to transmit the DC power therethrough, each of the main management unit and the plurality of sub-management units includes a communication unit, and each communication unit superimposes a communication signal on the DC power transmitted through the power line.

2. The management device according to claim 1, wherein each of the plurality of sub-management units further includes:

a voltage detection circuit that detects a voltage of each of the plurality of cells included in a corresponding one of the plurality of power storage modules; and an equalization circuit that equalizes capacities/voltages of the plurality of cells included in the corresponding one of the plurality of power storage modules, and the communication unit transmits the voltages of the plurality of cells detected by the voltage detection circuit to the main management unit via the power line, and receives a control signal for controlling the equalization circuit from the main management unit via the power line.

3. The management device according to claim 2, wherein each of the plurality of sub-management units further includes a direct current-direct current converter that converts a DC voltage supplied from a power storage unit other than the plurality of power storage modules via the power line, into a predetermined DC voltage, and the equalization circuit charges, among the plurality of cells included in the corresponding one of the plurality of power storage modules, a cell designated by the control signal with a DC voltage converted by the direct current-direct current converter.

4. The management device according to claim 1, wherein each of the plurality of sub-management units further includes a first signal wiring that connects a first connection point of the power line and a first communication terminal of the communication unit, a second signal wiring that connects a second connection point of the power line and a second communication terminal of the communication unit, a first insulating circuit that is inserted in the first signal wiring for insulating between the first connection point and the first communication terminal in terms of DC, a second insulating circuit that is inserted in the second signal wiring for insulating between the second connection point and the second communication terminal in terms of DC, and a low-pass filter inserted between the first connection point and the second connection point of the power line.

5. The management device according to claim 4, wherein the first insulating circuit is a capacitor,
the second insulating circuit is a capacitor, and
the low-pass filter is an inductor.

6. The management device according to claim 4, wherein the first insulating circuit is a transformer,
the second insulating circuit is a transformer, and
the low-pass filter is an inductor.

7. A power supply system comprising:
a plurality of power storage modules each including a plurality of cells connected in series, and
the management device according to claim 1.

* * * * *